(12) United States Patent
Choi et al.

(10) Patent No.: US 11,851,916 B2
(45) Date of Patent: Dec. 26, 2023

(54) HOOD RELEASE LEVER ASSEMBLY AND MOUNTING STRUCTURE THEREOF

(71) Applicants: Hyundai Motor Company, Seoul (KR); Kia Corporation, Seoul (KR)

(72) Inventors: Jae Ho Choi, Hwaseong-si (KR); Jin Young Park, Gimhae-si (KR); Jin Woo Kim, Incheon (KR); Sin Kook Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 67 days.

(21) Appl. No.: 17/705,938

(22) Filed: Mar. 28, 2022

(65) Prior Publication Data

US 2023/0023988 A1   Jan. 26, 2023

(30) Foreign Application Priority Data

Jul. 14, 2021   (KR) .......................... 10-2021-0092503

(51) Int. Cl.
| | |
|---|---|
| *E05B 79/06* | (2014.01) |
| *E05B 83/24* | (2014.01) |
| *E05B 79/20* | (2014.01) |
| *F16C 1/12* | (2006.01) |
| *F16C 1/10* | (2006.01) |

(52) U.S. Cl.
CPC ................ *E05B 79/06* (2013.01); *F16C 1/12* (2013.01); *E05B 79/20* (2013.01); *E05B 83/24* (2013.01); *F16C 1/102* (2013.01); *F16C 2350/52* (2013.01)

(58) Field of Classification Search
CPC .......... E05B 79/06; E05B 79/20; E05B 79/22; E05B 83/24; F16C 2350/52; B62D 25/12
See application file for complete search history.

(56) References Cited

FOREIGN PATENT DOCUMENTS

| | | | | |
|---|---|---|---|---|
| EP | 1536088 A2 | * | 6/2005 | ............... E05B 1/00 |
| KR | 20010066514 A | * | 7/2001 | |
| KR | 100427817 B1 | * | 4/2004 | |

OTHER PUBLICATIONS

USPTO Machine Translation (retrieved from FIT database) of the Description of KR 100427817 B1, Apr. 30, 2004. (Year: 2023).*

* cited by examiner

*Primary Examiner* — Daniel D Yabut
(74) *Attorney, Agent, or Firm* — Slater Matsil, LLP

(57) ABSTRACT

In an embodiment a hood release lever assembly includes a bracket and a hood release lever pivotally connected to the bracket, wherein the bracket includes a bracket body, a retention clip protruding from the bracket body, and a hooked rib located at a bottom end of the bracket body and wherein a free end of the hooked rib faces the retention clip.

16 Claims, 20 Drawing Sheets

HOOD RELEASE LEVER ASSEMBLY AND MOUNTING STRUCTURE THEREOF

CROSS-REFERENCE TO RELATED APPLICATIONS

This application is based on and claims the benefit of priority to Korean Patent Application No. 10-2021-0092503, filed on Jul. 14, 2021, in the Korean Intellectual Property Office, the disclosure of which is incorporated herein in its entirety by reference.

TECHNICAL FIELD

The present disclosure relates to a hood release lever assembly that may be easily mounted on a front interior panel of a vehicle without any tool, and a mounting structure thereof.

BACKGROUND

A hood release lever assembly may be mounted on an instrument panel (or dash board) of a vehicle adjacent to a driver's seat, and the hood release lever assembly may be connected to a latch assembly of a hood through a release cable.

FIGS. 17 to 20 illustrate a hood release lever assembly for a vehicle according to the related art.

Referring to FIG. 17, the hood release lever assembly for a vehicle may include a hood release lever 110 and a bracket 120, and the hood release lever 110 may be pivotally mounted on the bracket 120 through a pivot pin 160. An instrument panel 200 may have an opening 220 and an engagement shoulder 230, and the bracket 120 may have a projection 150. As at least an upper portion of the projection 150 is spaced apart from the bracket 120, a recess 151 may be defined between the bracket 120 and the projection 150. An upper clip 140 may be connected to a bottom end of the projection 150, and the upper clip 140 may be elastically deformable. A lower clip 130 may be provided on a bottom end of the bracket 120, and the lower clip 130 may be elastically deformable.

Referring to FIG. 18, when an worker inserts the projection 150 of the bracket 120 into the opening 220 of the instrument panel 200, a top end of the lower clip 130 of the bracket 120 may come into contact with the engagement shoulder 230 of the instrument panel 200. Then, the worker may push the bracket 120 upwardly to move the bracket 120 along the instrument panel 200 (see a direction indicated by arrow U in FIG. 18). As illustrated in FIG. 19, as the upper clip 140 of the bracket 120 is elastically deformed in the opening 220 of the instrument panel 200, the recess 151 of the projection 150 may be fitted to a top edge of the opening 220 of the instrument panel 200, and the lower clip 130 of the bracket 120 may be engaged with the engagement shoulder 230 of the instrument panel 200. That is, the bracket 120 may be fixed to the instrument panel 200 through the projection 150, the upper clip 140, and the lower clip 130.

In the related art hood release lever assembly, since it is necessary to check with the naked eye whether the projection 150 of the bracket 120 is seated in the opening 220 of the instrument panel 200, the worker's work efficiency and assembling of the bracket 120 may be reduced.

In the related art hood release lever assembly, when the lower clip 130 of the bracket 120 is seated on the engagement shoulder 230 of the instrument panel 200, a reaction force may be generated due to interference between the upper clip 140 and the instrument panel 200, and an external force (fastening force) may be required for the upper clip 140 to be seated in the opening 220 of the instrument panel 200. The external force for joining the bracket 120 and the instrument panel 200 may be distributed to the upper clip 140 and the lower clip 130, making it difficult to mount the bracket 120 on the instrument panel 200.

In the related art hood release lever assembly, when the lower clip 130 is seated on the engagement shoulder 230 of the instrument panel 200 in a state in which the upper clip 140 is pressed, a reaction force generated between the lower clip 130 and the instrument panel 200 may make it difficult to mount the bracket 120 on the instrument panel 200.

In the related art hood release lever assembly, as the worker pushes the bracket 120 upwardly to move the bracket 120 along the instrument panel 200 in a state in which the upper clip 140 of the bracket 120 is seated in the opening 220 of the instrument panel 200 and the lower clip 130 of the bracket 120 is seated on the engagement shoulder 230 of the instrument panel 200, the upper clip 140 may be engaged with the opening 220 of the instrument panel 200, and the lower clip 130 may be engaged with the engagement shoulder 230 of the instrument panel 200. However, when the worker pushes the bottom end of the bracket 120 upwardly, excessive pressure on the worker's fingers may occur since a gripping surface of the bracket 120 has a relatively narrow area.

Referring to FIG. 20, when the lower clip 130 of the bracket 120 is not correctly seated (positioned) on the engagement shoulder 230 of the instrument panel 200, an end portion of the lower clip 130 may contact a portion of the engagement shoulder 230 of the instrument panel 200. In this state, when the recess 151 is fitted into the opening 220 of the instrument panel 200, the projection 150 may apply a first external force to the instrument panel 200 by an elastic force of the upper clip 140, and a free end of the lower clip 130 may apply a second external force to the instrument panel 200 in a direction opposite to the first external force, and thus the bracket 120 and the instrument panel 200 may be incorrectly assembled. In the related art hood release lever assembly, when the lower clip 130 is not correctly seated on the engagement shoulder 230 of the instrument panel 200, this may result in faulty assembly of the bracket 120 and the instrument panel 200.

According to another related art, a hood release lever assembly may be mounted on a lower panel of a crush pad located in front of the driver's seat through screws and/or the like.

According to an assembly method, the release cable may be connected to the hood release lever assembly, and then the hood release lever may be joined to the lower panel of the crush pad through screws. However, it may be very difficult to perform an assembly process using a tool such as a screwdriver since the lower panel of the crush pad has a very narrow space.

According to another assembly method, the hood release lever assembly may be mounted on the lower panel through screws, and then the release cable may be connected to the hood release lever assembly. Finally, the lower panel assembled with the hood release lever assembly and the release cable may be joined to the crush pad. However, since the assembly sequence and assembly method are very complex, the manufacturing cost may be high and the assembly work efficiency may be low.

The above information described in this background section is provided to assist in understanding the background of the inventive concept, and may include any technical concept which is not considered as the prior art that is already known to those skilled in the art.

SUMMARY

Embodiments provide a hood release lever assembly that may be easily mounted on a front interior panel of a vehicle without any tool, and a mounting structure thereof.

According to an embodiment of the present disclosure, a hood release lever assembly may include: a bracket; and a hood release lever pivotally connected to the bracket. The bracket may include a bracket body, a retention clip protruding from the bracket body, and a hooked rib provided on a bottom end of the bracket body. A free end of the hooked rib may face the retention clip. As the free end of the hooked rib provided on the bottom end of the bracket body faces the retention clip provided on an upper portion of the bracket, and the hooked rib is allowed to rotate around a bottom end of a front interior panel, an external force for assembly of the bracket and the front interior panel may only be applied in a rotation direction of the bracket, and thus the assembly (mounting) of the hood release lever assembly with respect to the front interior panel may be performed in one direction. Thus, the hood release lever assembly and the front interior panel of the vehicle may be assembled quickly and easily without any tool.

The hooked rib may have a round surface provided therein, and the round surface may have a predetermined radius of curvature. The round surface may rotatably contact a bottom end of a mounting wall of the front interior panel, and thus the bracket body may easily rotate on the bottom end of the mounting wall.

The retention clip may include: a first leg protruding from the bracket body toward the front interior panel; a second leg inclined with respect to the first leg at a predetermined angle; and a retention shoulder provided on a free end of the second leg. The first leg and the second leg of the retention clip may be elastically deformed so that the retention clip and the retention shoulder may be quickly and firmly fitted into a mounting hole of the mounting wall of the front interior panel.

The retention clip may further include a retention stopper inclined with respect to the retention shoulder. When the retention shoulder is caught in the mounting hole of the mounting wall of the front interior panel, the retention shoulder may be accurately positioned in the mounting hole by the retention stopper.

The retention shoulder may be spaced apart from the bracket body by a first gap, and the free end of the hooked rib may be spaced apart from the bracket body by a second gap. The second gap may be greater than the first gap. When a top end of the bracket body comes into contact with the mounting wall of the front interior panel before the hooked rib is temporarily engaged with the bottom end of the mounting wall, the retention shoulder of the retention clip may be prevented from being inserted into the mounting hole of the mounting wall. Thus, the bracket may be prevented from being incorrectly mounted on the mounting wall.

The bracket body may have a slot, the first leg may be connected to a first edge of the slot in a cantilevered manner, and the retention shoulder may be spaced apart from a second edge of the slot. As the retention clip is elastically deformed with respect to the bracket body, the retention clip may be may easily be inserted and fitted into the mounting hole of the mounting wall.

The second edge of the slot may be positioned closer to the hooked rib than the first edge of the slot. As the second edge of the slot is closer to the hooked rib than the first edge of the slot, the retention shoulder may be positioned relatively close to the hooked rib. The retention shoulder and the retention stopper may be sufficiently spaced apart from the bracket body. Thus, the hooked rib may be spaced apart from the bracket body with a gap enough to prevent incorrect assembly.

The bracket body may further include a guide projection provided between the retention clip and the hooked rib. The guide projection may have a conical shape having a diameter which decreases in a direction away from the bracket body. As the guide projection having the conical shape comes into contact with a guide hole of the mounting wall, the bracket body may move upwardly along the mounting wall, and thus the retention shoulder of the retention clip may be positioned more accurately and easily in the second edge of the mounting hole by the guide projection. When the retention clip is completely snap-fitted into the mounting hole of the mounting wall, a portion of the guide projection adjacent to the bracket body may be press-fitted into the guide hole of the mounting wall so that the bracket may be prevented from moving upwardly and downwardly with respect to the mounting wall.

The bracket may include first and second bracket-side pivot lugs provided on both top sides of the bracket body. The hood release lever may include first and second lever-side pivot lugs provided on both top sides thereof. The first bracket-side pivot lug may be pivotally connected to the first lever-side pivot lug through a first pivot pin, and the second bracket-side pivot lug may be pivotally connected to the second lever-side pivot lug through a second pivot pin. Thus, the hood release lever may reliably pivot with respect to the bracket through the bracket-side pivot lugs and the lever-side pivot lugs.

The first pivot pin may protrude from the first bracket-side pivot lug toward the first lever-side pivot lug, and the second pivot pin may protrude from the second bracket-side pivot lug toward the second lever-side pivot lug. A pivot connection between the bracket and the hood release lever may be made firmly and reliably.

The hood release lever assembly may include a torsion spring provided between the bracket and the hood release lever. The torsion spring may cause the hood release lever to be biased toward a predetermined position. Thus, the hood release lever may be stably supported by the torsion spring.

According to another embodiment of the present disclosure, a mounting structure of a hood release lever assembly may include: a hood release lever assembly including a bracket and a hood release lever pivotally connected to the bracket; and a front interior panel having a mounting wall on which the bracket is mounted. The bracket may include a bracket body, a retention clip protruding from the bracket body toward the mounting wall of the front interior panel, and a hooked rib provided on a bottom end of the bracket body. The mounting wall may have a mounting hole into which the retention clip is fitted, the hooked rib may have a cavity in which a bottom end of the mounting wall is received, and a free end of the hooked rib may face the retention clip. As the free end of the hooked rib provided on the bottom end of the bracket body faces the retention clip provided on an upper portion of the bracket, and the hooked rib is allowed to rotate around the bottom end of the front interior panel, an external force for assembly of the bracket and the front interior panel may only be applied in a rotation direction of the bracket, and thus the assembly (mounting)

of the hood release lever assembly with respect to the front interior panel may be performed in one direction. Thus, the hood release lever assembly and the front interior panel of the vehicle may be assembled quickly and easily without any tool.

The hooked rib may have a first round surface provided in the cavity thereof, the mounting wall may have a second round surface provided on the bottom end thereof and contacting the first round surface, and the second round surface may have a predetermined radius of curvature which is the same as that of the first round surface. The round surface of the hooked rib may rotatably contact the bottom end of the mounting wall of the front interior panel, and thus the bracket body may easily rotate on the bottom end of the mounting wall.

The mounting wall may include a first surface facing the hood release lever assembly, and a second surface opposing the first surface, and the mounting wall may include a guide surface inclined from the mounting hole. When the retention clip of the bracket body is inserted into the mounting hole of the mounting wall, the retention clip may be stably guided into the mounting hole through the guide surface.

The bracket body may further include a guide projection provided between the retention clip and the hooked rib, and the guide projection may have a conical shape having a diameter which decreases in a direction away from the bracket body. The mounting wall may have a guide hole into which the guide projection is inserted. As the guide projection having the conical shape comes into contact with the guide hole of the mounting wall, the bracket body may move upwardly along the mounting wall, and thus the retention shoulder of the retention clip may be positioned more accurately and easily in the second edge of the mounting hole by the guide projection. When the retention clip is completely snap-fitted into the mounting hole of the mounting wall, a portion of the guide projection adjacent to the bracket body may be press-fitted into the guide hole of the mounting wall so that the bracket may be prevented from moving upwardly and downwardly with respect to the mounting wall.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
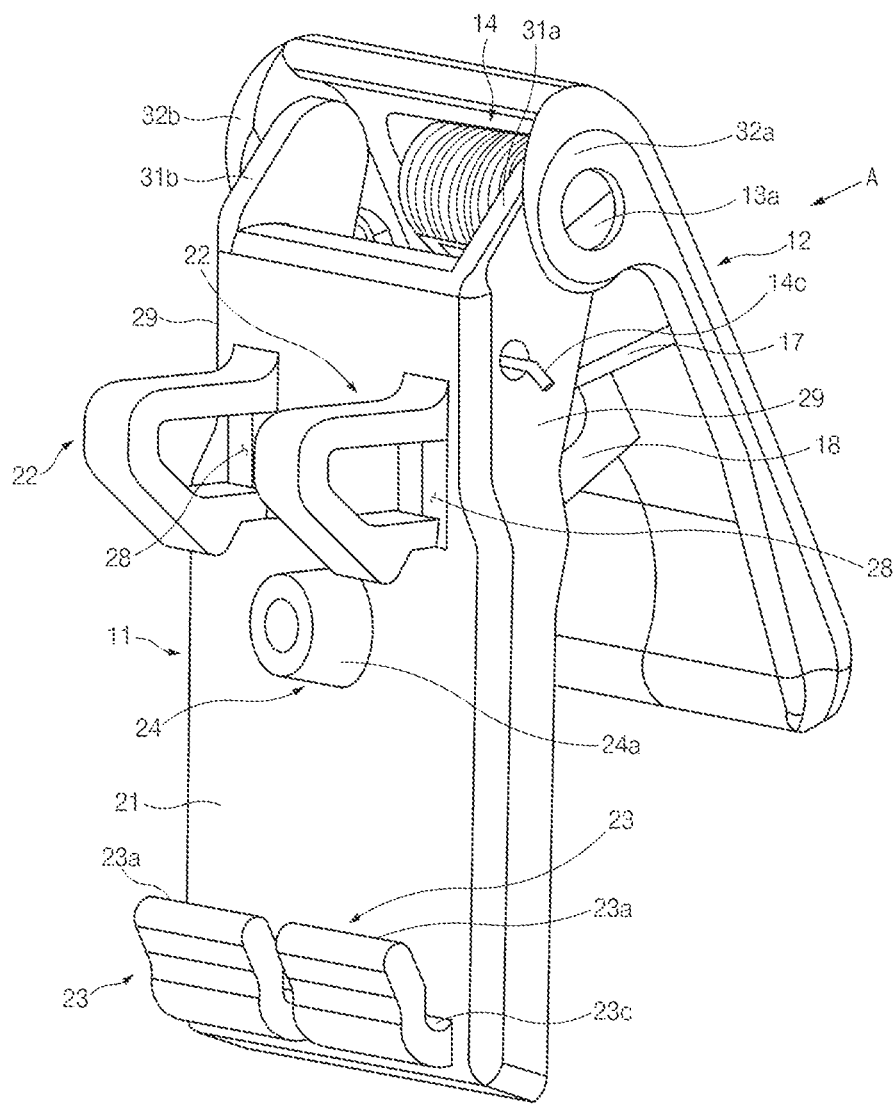
FIG. 1 illustrates a perspective view of a hood release lever assembly according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a hood release lever assembly 10 according to an exemplary embodiment of the present disclosure may include a bracket 11, and a hood release lever 12 pivotally connected to the bracket 11 through pivot pins 13a and 13b.

Referring to FIGS. 8 to 13, the hood release lever assembly 10 according to an exemplary embodiment of the present disclosure may be mounted on a front interior panel 1 of a vehicle located in front of a driver's seat. In particular, the hood release lever assembly 10 may be mounted on a lower portion of the front interior panel 1 adjacent to the driver's seat, and the hood release lever assembly 10 may be connected to a hood latch assembly (not shown) of the vehicle through a release cable 15.

Figure 7:
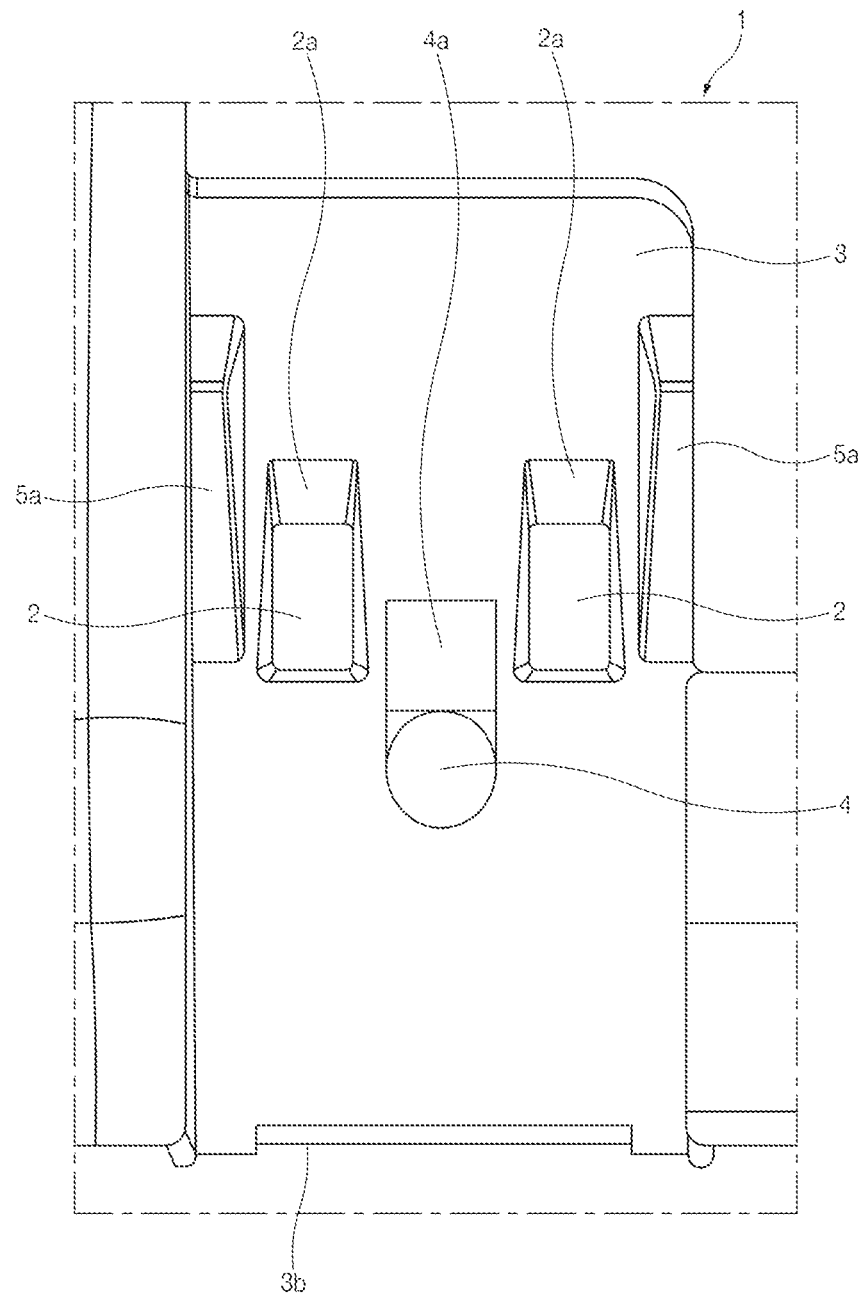
FIG. 7 illustrates a portion of a front interior panel of a vehicle on which a hood release lever assembly according to an exemplary embodiment of the present disclosure is to be mounted.

Referring to FIG. 7, the front interior panel 1 may include a mounting wall 3 on which the bracket 11 is mounted, and the mounting wall 3 may be recessed from the front interior panel 1. For example, the front interior panel 1 may be any one of a lower panel of a crash pad, an instrument panel, and a dash panel, located in front of the driver's seat and a front passenger seat of the vehicle.

One or more mounting holes 2 may be provided in the mounting wall 3. Referring to FIG. 7, two mounting holes 2 may be provided in the mounting wall 3 of the front interior panel 1. Each mounting hole 2 may have a first edge and a second edge. The first edge of the mounting hole 2 may be a top edge of the mounting hole 2 facing a top end of the mounting wall 3, and the second edge of the mounting hole 2 may be a bottom edge of the mounting hole 2 facing a bottom end of the mounting wall 3. A guide surface 2a may be inclined from the first edge of the mounting hole 2.

Figure 10:
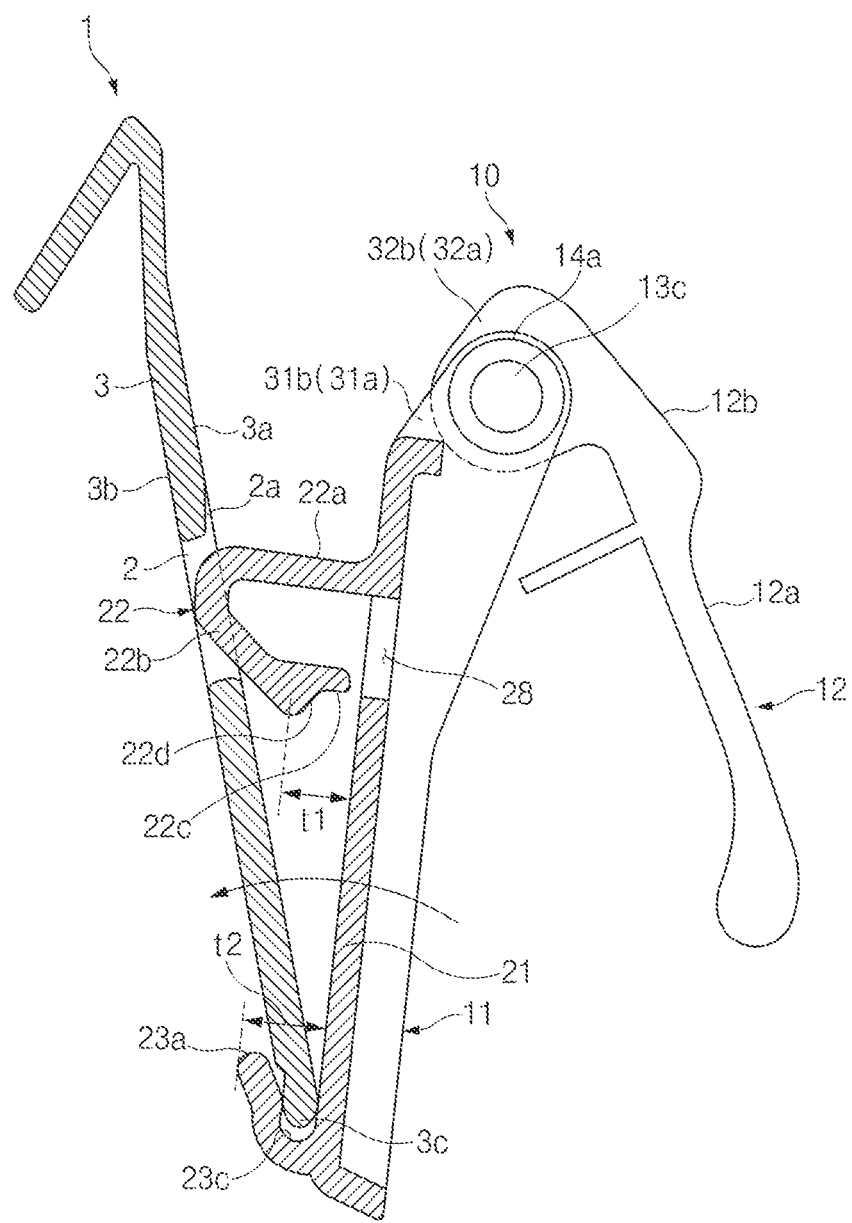
FIG. 10 illustrates a state in which a hooked rib of a bracket is temporarily engaged with a bottom end of a mounting wall of a front interior panel before a retention clip of the bracket is fitted into a mounting hole of the mounting wall, taken along line F-F of FIG. 9.
Figure 11:
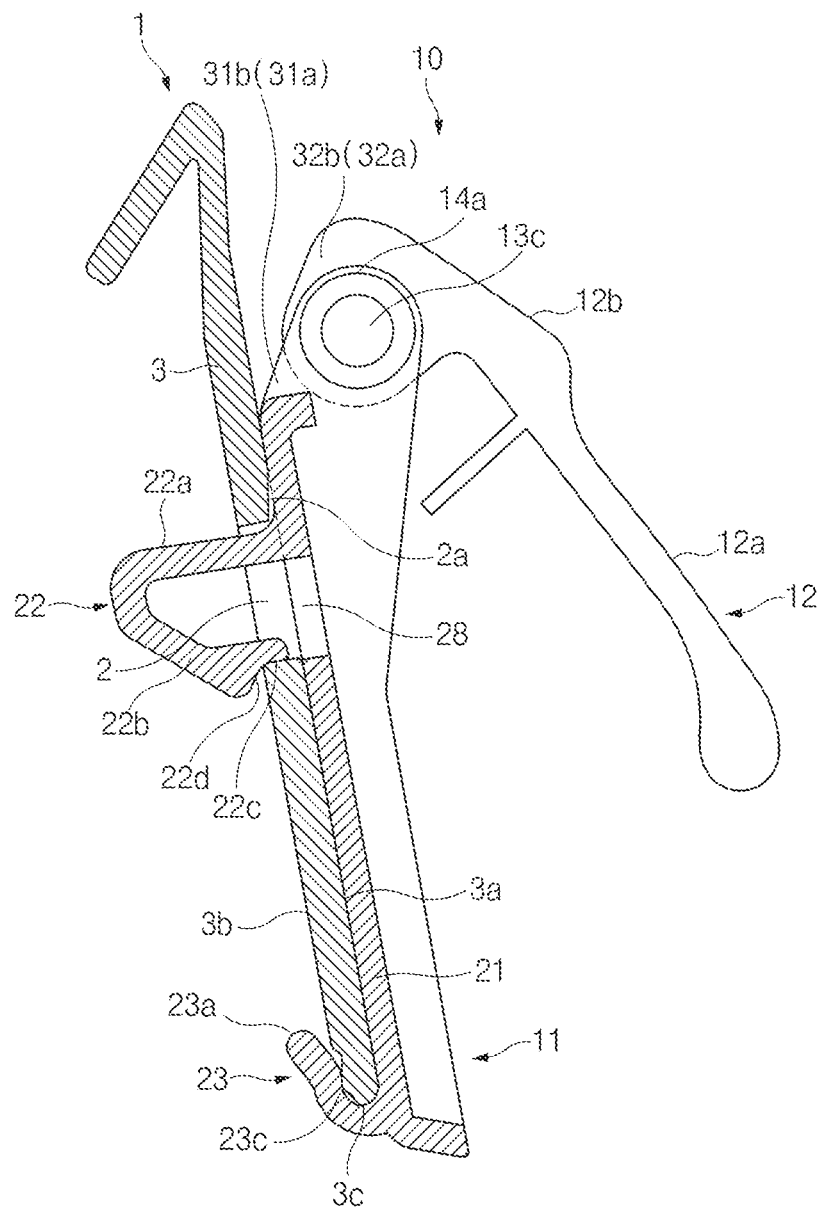
FIG. 11 illustrates a state in which the bracket is completely mounted on the mounting wall of the front interior panel, taken along line F-F of FIG. 9.

Referring to FIGS. 10 and 11, the mounting wall 3 may have a first surface 3a facing the interior of the vehicle and the hood release lever assembly 10, and a second surface 3b opposing the first surface 3a. The guide surface 2a may be inclined from the first edge of the mounting hole 2, and the guide surface 2a may be inclined with respect to the first surface 3a of the mounting wall 3 at a predetermined angle.

Figure 12:
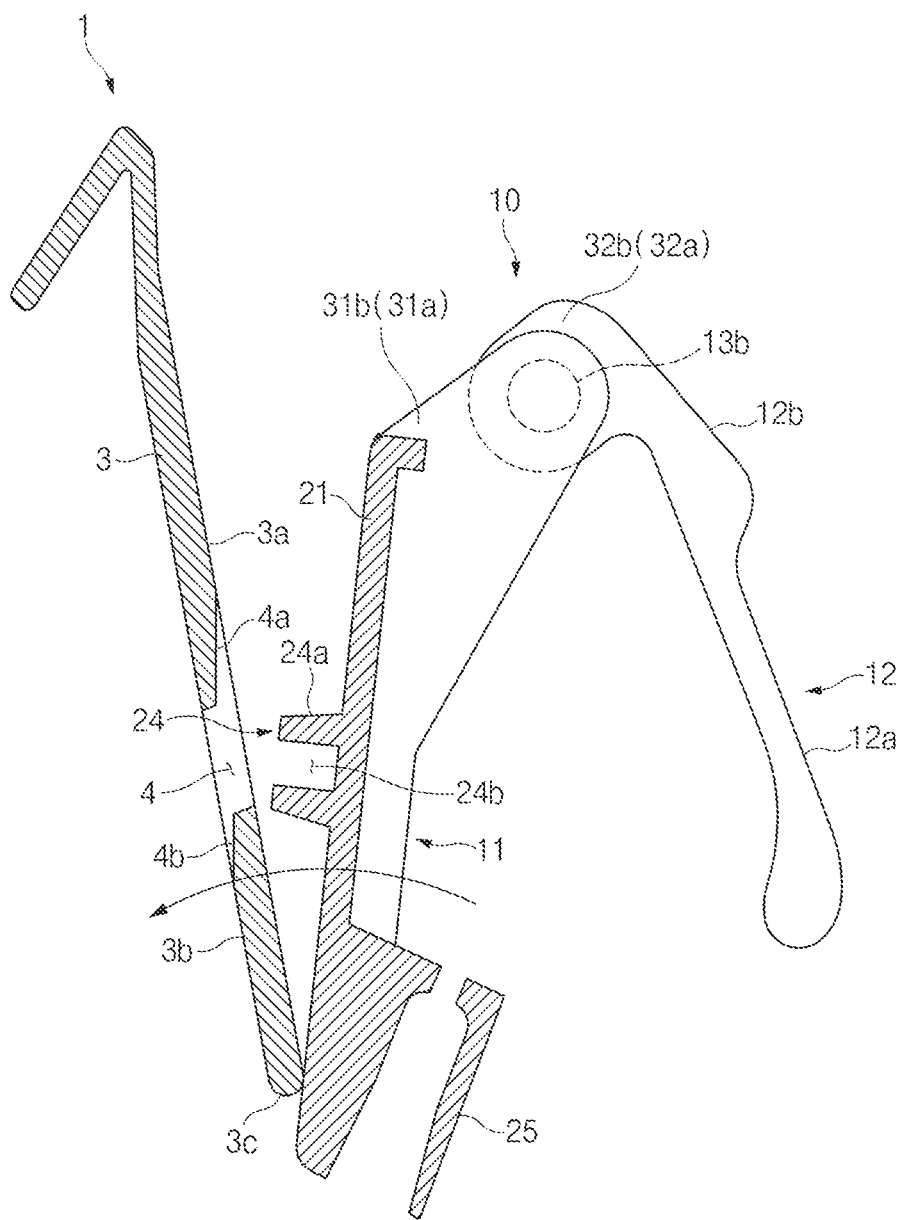
FIG. 12 illustrates a state before a guide projection of the bracket is inserted into a guide hole of the mounting wall, taken along line G-G of FIG. 9.
Figure 13:
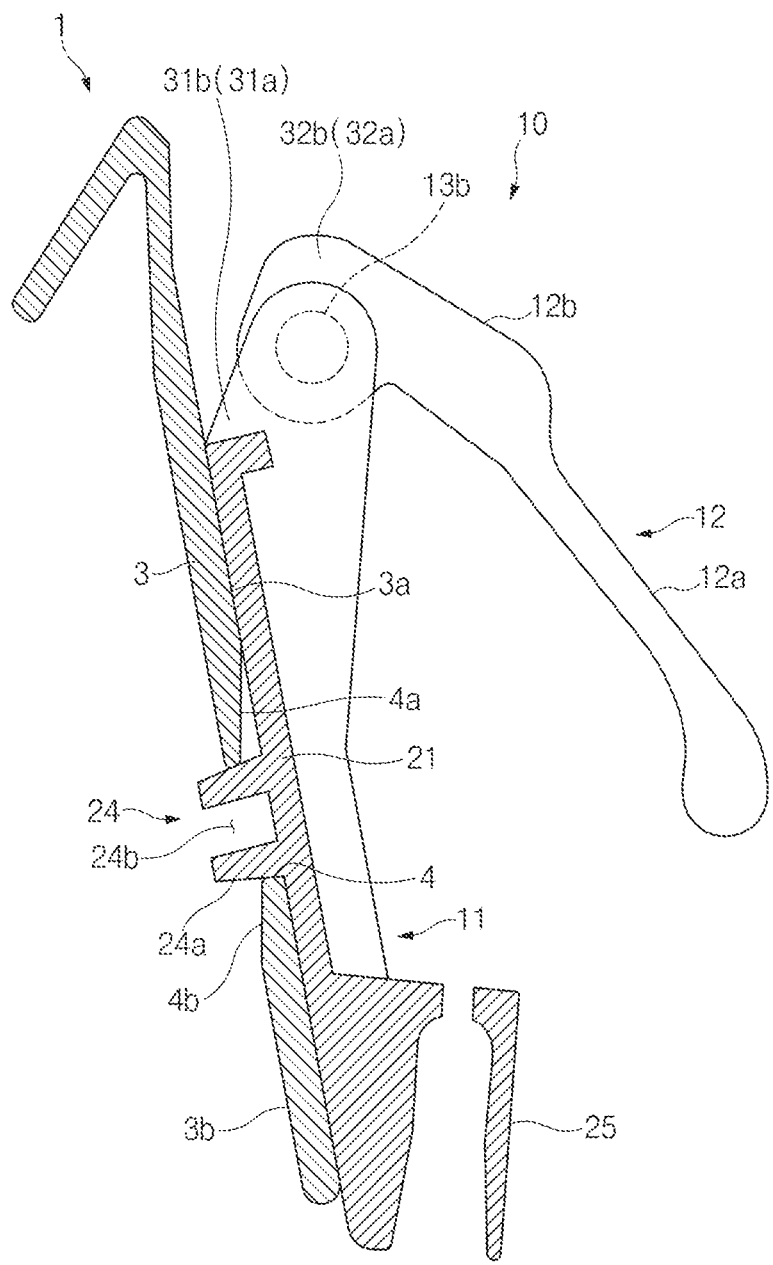
FIG. 13 illustrates a state in which the guide projection of the bracket is completely inserted into the guide hole of the mounting wall, taken along line G-G of FIG. 9.

Referring to FIGS. 12 and 13, a guide hole 4 may be provided in a middle portion of the mounting wall 3, and the guide hole 4 may be positioned below the mounting hole 2. The guide hole 4 may have a first edge and a second edge. The first edge of the guide hole 4 may be a top edge of the guide hole 4 facing the top end of the mounting wall 3, and the second edge of the guide hole 4 may be a bottom edge of the guide hole 4 facing the bottom end of the mounting wall 3. A first inclined surface 4a may be inclined from the first edge of the guide hole 4, and the first inclined surface 4a may be inclined with respect to the first surface 3a of the mounting wall 3 at a predetermined angle. A second inclined surface 4b may be inclined from the second edge of the guide hole 4, and the second inclined surface 4b may be inclined with respect to the second surface 3b of the mounting wall 3 at a predetermined angle.

Referring to FIG. 1, the bracket 11 may include a bracket body 21, a retention clip 22 provided on an upper portion of the bracket body 21, and a hooked rib 23 provided on a bottom end of the bracket body 21.

The bracket body 21 may have one or more slots 28 provided in the upper portion thereof. One or more retention clips 22 may be aligned with one or more slots 28. Referring to FIG. 1, two slots 28 may be provided in the upper portion of the bracket body 21, and the two slots 28 may be spaced apart from each other in a width direction of the bracket body 21. Two retention clips 22 may be spaced apart from each other in the width direction of the bracket body 21, and the two retention clips 22 may be aligned with the two slots 28, respectively.

Referring to FIGS. 3, 4, 10, and 11, the retention clip 22 may include a first leg 22a protruding from the bracket body 21 toward the mounting wall 3 of the front interior panel 1, a second leg 22b inclined with respect to the first leg 22a at a predetermined angle, and a retention shoulder 22c provided on a free end of the second leg 22b.

Referring to FIGS. 1, 3, 10, and 11, the slot 28 may have a first edge and a second edge. The first edge of the slot 28 may be a top edge of the slot 28 facing a top end of the bracket body 21, and the second edge of the slot 28 may be a bottom edge of the slot 28 facing the bottom end of the bracket body 21. The first leg 22a may protrude from the first edge of the slot 28 of the bracket body 21 toward the mounting hole 2 of the mounting wall 3 of the front interior panel 1. In particular, the first leg 22a may be connected to the first edge of the slot 28 of the bracket body 21 in a cantilevered manner. The first leg 22a may be elastically deformed with respect to the bracket body 21.

Referring to FIGS. 10 and 11, the second leg 22b may be inclined from a free end of the first leg 22a at a predetermined angle, and the free end of the second leg 22b may be adjacent to or be parallel to the slot 28 of the bracket body 21. The free end of the second leg 22b may be spaced apart from the bracket body 21 by a predetermined gap. Meanwhile, the second leg 22b may be positioned below the first leg 22a, and the free end of the second leg 22b may be adjacent to the second edge of the slot 28 of the bracket body 21. As the first leg 22a is elastically deformed, the second leg 22b may be deformed with the first leg 22a in the same direction.

Referring to FIGS. 10 and 11, the retention shoulder 22c may be provided on the free end of the second leg 22b. The retention shoulder 22c may face the bottom end of the bracket body 21, and the retention shoulder 22c may be spaced apart from the second edge of the slot 28 of the bracket body 21. The retention shoulder 22c may be aligned with the second edge of the slot 28 of the bracket body 21. Referring to FIG. 11, the retention shoulder 22c may be caught in the second edge of the mounting hole 2 in the mounting wall 3 of the front interior panel 1.

Referring to FIGS. 10 and 11, the retention clip 22 may further include a retention stopper 22d inclined with respect to the retention shoulder 22c. As illustrated in FIG. 11, when the retention shoulder 22c is engaged with the second edge of the mounting hole 2, the retention shoulder 22c may be accurately positioned in the second edge of the mounting hole 2 by the retention stopper 22d.

The hooked rib 23 may be curved from the bottom end of the bracket body 21 or a portion of the bracket body 21 adjacent to the bottom end of the bracket body 21 toward the retention shoulder 22c of the retention clip 22. The hooked rib 23 may define a cavity in which the bottom end of the mounting wall 3 is received. In particular, the hooked rib 23 may have a first round surface 23c provided in the cavity thereof, and the first round surface 23c may have a predetermined radius of curvature. The mounting wall 3 of the front interior panel 1 may have a second round surface 3c provided on the bottom end thereof, and the second round surface 3c may have a predetermined radius of curvature.

The first round surface 23c may rotatably contact the second round surface 3c of the mounting wall 3. In particular, the first round surface 23c may have the same radius of curvature as that of the second round surface 3c, and thus the bracket body 21 may easily rotate on the bottom end of the mounting wall 3 through the hooked rib 23.

As illustrated in FIG. 10, when the hooked rib 23 of the bracket body 21 is temporarily engaged with the bottom end of the mounting wall 3 of the front interior panel 1, the bottom end of the mounting wall 3 may be received in the cavity of the hooked rib 23 of the bracket body 21, and the first round surface 23c of the hooked rib 23 may contact the second round surface 3c of the mounting wall 3. As illustrated in FIG. 11, when the bracket body 21 rotates on the bottom end of the mounting wall 3 toward the mounting wall 3, the first round surface 23c of the hooked rib 23 may come into contact with the second round surface 3c of the mounting wall 3 and accordingly the hooked rib 23 may easily rotate around the second round surface 3c of the mounting wall 3. When the bracket body 21 rotates on the hooked rib 23 and the bottom end of the mounting wall 3 toward the first surface 3a of the mounting wall 3, the second leg 22b of the retention clip 22 may pass through the second edge of the mounting hole 2, and the first leg 22a of the retention clip 22 may be guided by the guide surface 2a to pass through the first edge of the mounting hole 2. When the retention clip 22 is inserted into the mounting hole 2, the first leg 22a and the second leg 22b of the retention clip 22 may be elastically deformed in the mounting hole 2 of the mounting wall 3. When the retention clip 22 is completely inserted into the mounting hole 2 of the mounting wall 3, as illustrated in FIG. 11, the first leg 22a of the retention clip 22 may be supported by the first edge of the mounting hole 2, and the retention shoulder 22c of the retention clip 22 may be engaged with the second edge of the mounting hole 2.

Referring to FIGS. 1, 12, and 13, the bracket body 21 may further include a guide projection 24 provided between the retention clip 22 and the hooked rib 23. The guide projection 24 may protrude from the bracket body 21 toward the mounting wall 3 of the front interior panel 1. The guide projection 24 may have a cavity 24b provided therein, and accordingly an overall weight of the bracket 11 may be reduced. In particular, the guide projection 24 may have a conical shape having a tapered surface 24a, and a diameter of the guide projection 24 may decrease from the bracket body 21 toward the mounting wall 3 due to the tapered surface 24a. An outer diameter of at least a portion of the guide projection 24 may be the same as an inner diameter of the mounting hole 2 of the mounting wall 3. Specifically, a free end of the guide projection 24 facing the mounting wall 3 may have the smallest outer diameter, and a fixed end of the guide projection 24 fixed to the bracket body 21 may have the largest outer diameter. For example, the outer diameter of the fixed end of the guide projection 24 fixed to the bracket body 21 may be the same as the inner diameter of the mounting hole 2 of the mounting wall 3.

Referring to FIG. 1, two hooked ribs 23 may be provided on the bottom end of the bracket body 21, and the two hooked ribs 23 may be spaced apart from each other in the width direction of the bracket body 21. Each hooked rib 23 may face the corresponding retention clip 22 in a longitudinal direction of the bracket body 21.

Figure 3:
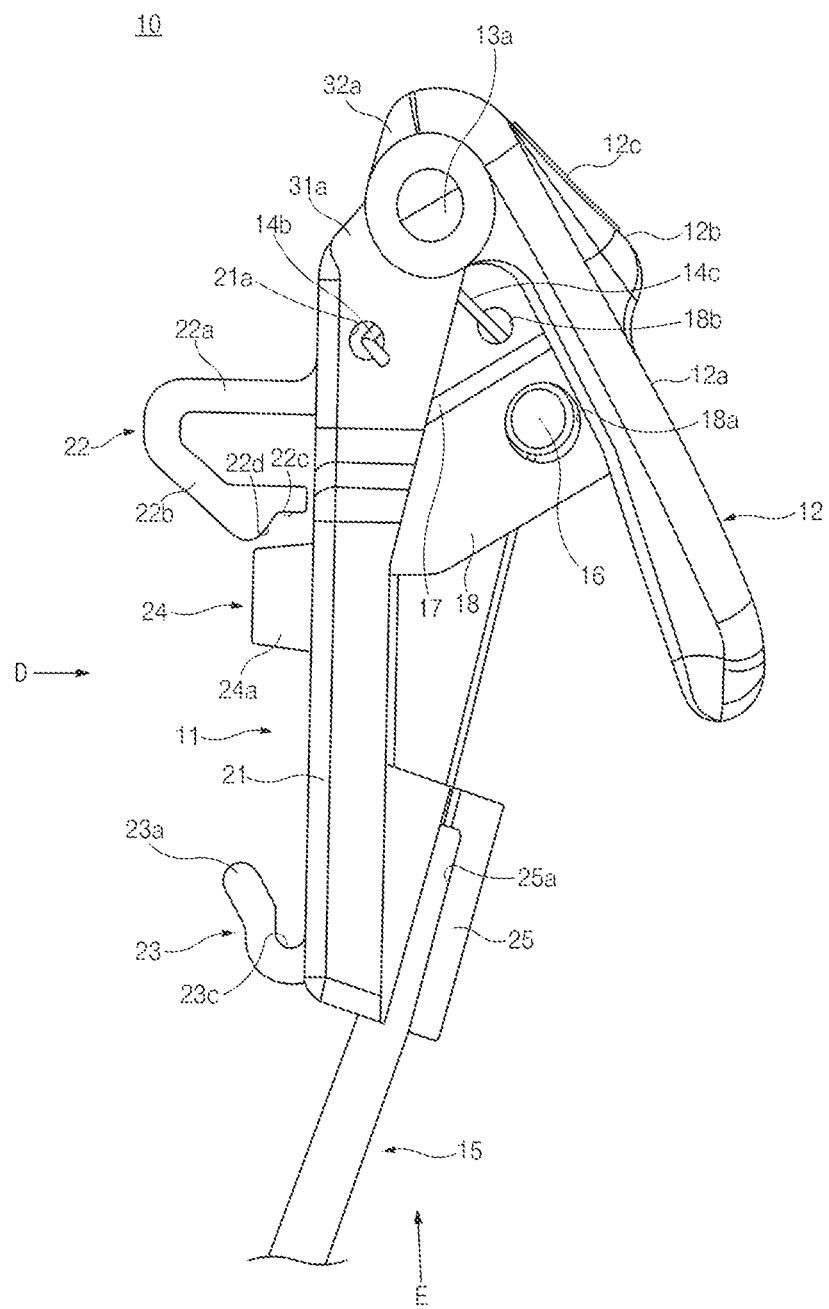
FIG. 3 illustrates a view which is viewed from a direction indicated by arrow B of FIG. 2.

As illustrated in FIGS. 1 and 3, the first edge of the slot 28 may be relatively far from the hooked rib 23 and the guide projection 24, and the second edge of the slot 28 may be relatively close to the hooked rib 23 and the guide projection 24. Accordingly, the second edge of the slot 28 may be positioned closer to the hooked rib 23 and the guide projection 24 than the first edge of the slot 28, and the second leg 22b and the retention shoulder 22c may be positioned closer to the guide projection 24 and the hooked rib 23 than the first leg 22a. The retention shoulder 22c and the retention stopper 22d may be sufficiently spaced apart from the bracket body 21.

When the bracket body 21 rotates on the bottom end of the mounting wall 3 toward the mounting wall 3 in a state in which the hooked rib 23 of the bracket body 21 is temporarily engaged with the bottom end of the mounting wall 3, the guide projection 24 may be guided to the guide hole 4 of the mounting wall 3 of the front interior panel 1 as illustrated in FIGS. 12 and 13. Here, the guide projection 24 may come into contact with the second edge of the guide hole 4 and then come into contact with the first edge of the guide hole 4. In particular, as the tapered surface 24a of the guide projection 24 comes into contact with the guide hole 4, the bracket body 21 may move upwardly along the mounting wall 3, and thus the retention shoulder 22c of the retention clip 22 may be positioned more accurately and easily in the second edge of the mounting hole 2 by the tapered surface 24a of the guide projection 24. When the retention clip 22 is completely snap-fitted into the mounting hole 2 of the mounting wall 3, a portion of the guide projection 24 adjacent to the fixed end of the guide projection 24 may be press-fitted into the guide hole 4 of the mounting wall 3 so that the bracket 11 may be prevented from moving upwardly and downwardly with respect to the mounting wall 3. Thus, the bracket 11 may be quickly and firmly mounted on the mounting wall 3 of the front interior panel 1 by the guide projection 24.

Figure 5:
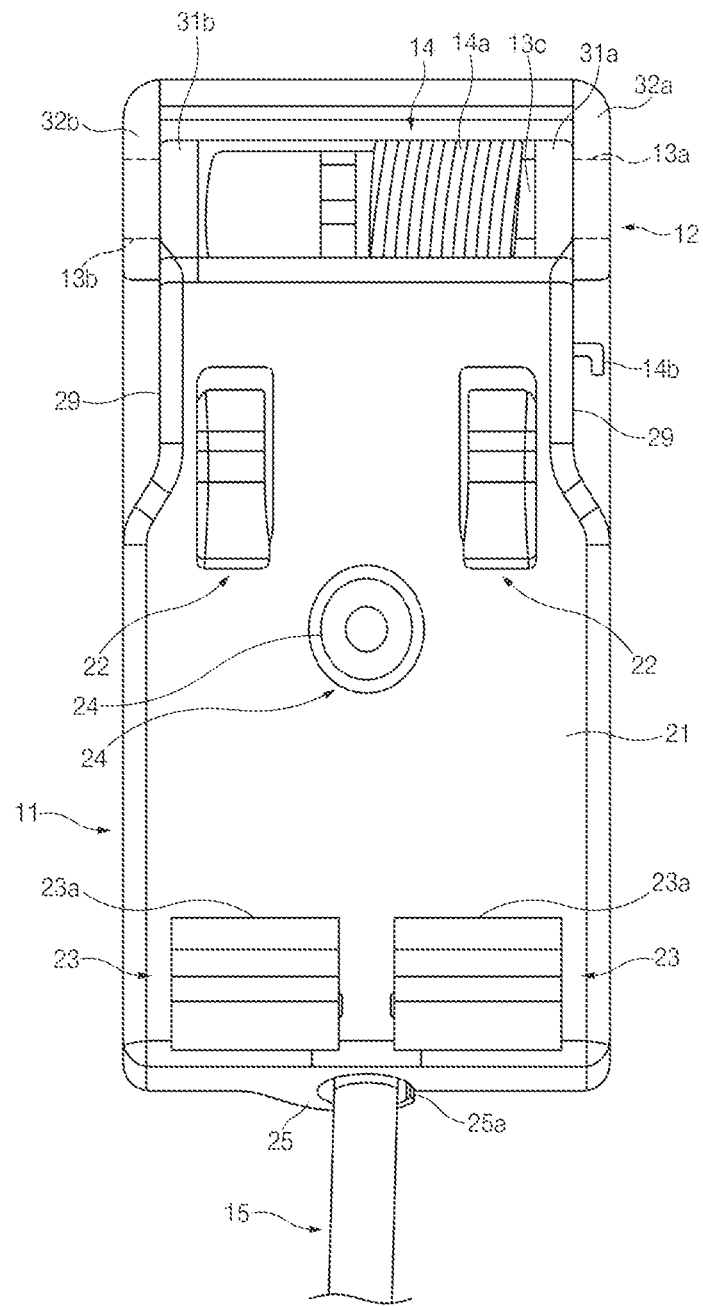
FIG. 5 illustrates a view which is viewed from a direction indicated by arrow D of FIG. 3.

Referring to FIG. 7, the mounting wall 3 may have two raised portions 5a provided on edges of the first surface 3a, and the two raised portions 5a may be raised from the first surface 3a toward the bracket 11. Referring to FIG. 5, the bracket body 21 may have two recessed portions 29 provided in both upper side portions thereof, and the two recessed portions 29 may be recessed toward the center of the bracket body 21. When the bracket body 21 is mounted on the first surface 3a of the mounting wall 3, the raised portions 5a of the mounting wall 3 may be inserted into the recessed portions 29 of the bracket body 21, respectively.

Figure 2:
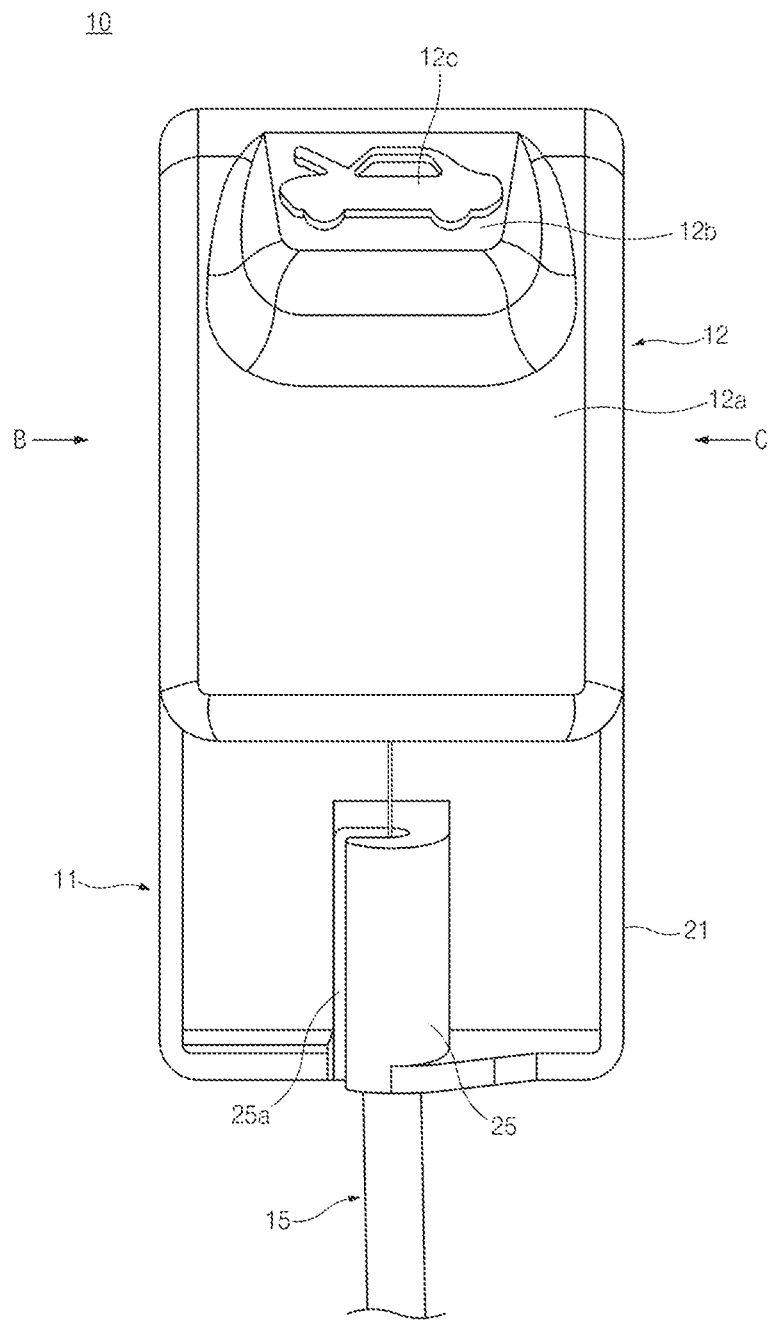
FIG. 2 illustrates a view which is viewed from a direction indicated by arrow A of FIG. 1.
Figure 8:
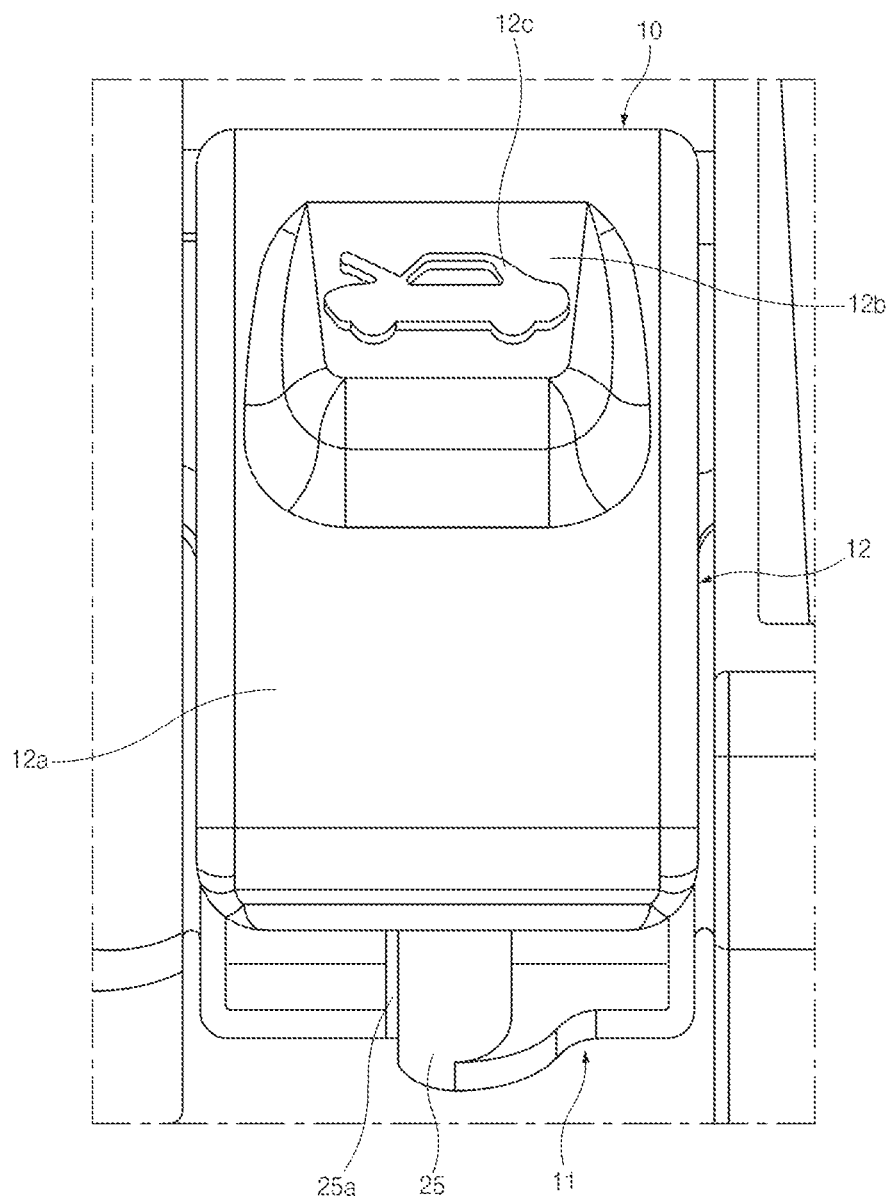
FIG. 8 illustrates a state in which a hood release lever assembly according to an exemplary embodiment of the present disclosure is mounted on a front interior panel of a vehicle.
Figure 9:
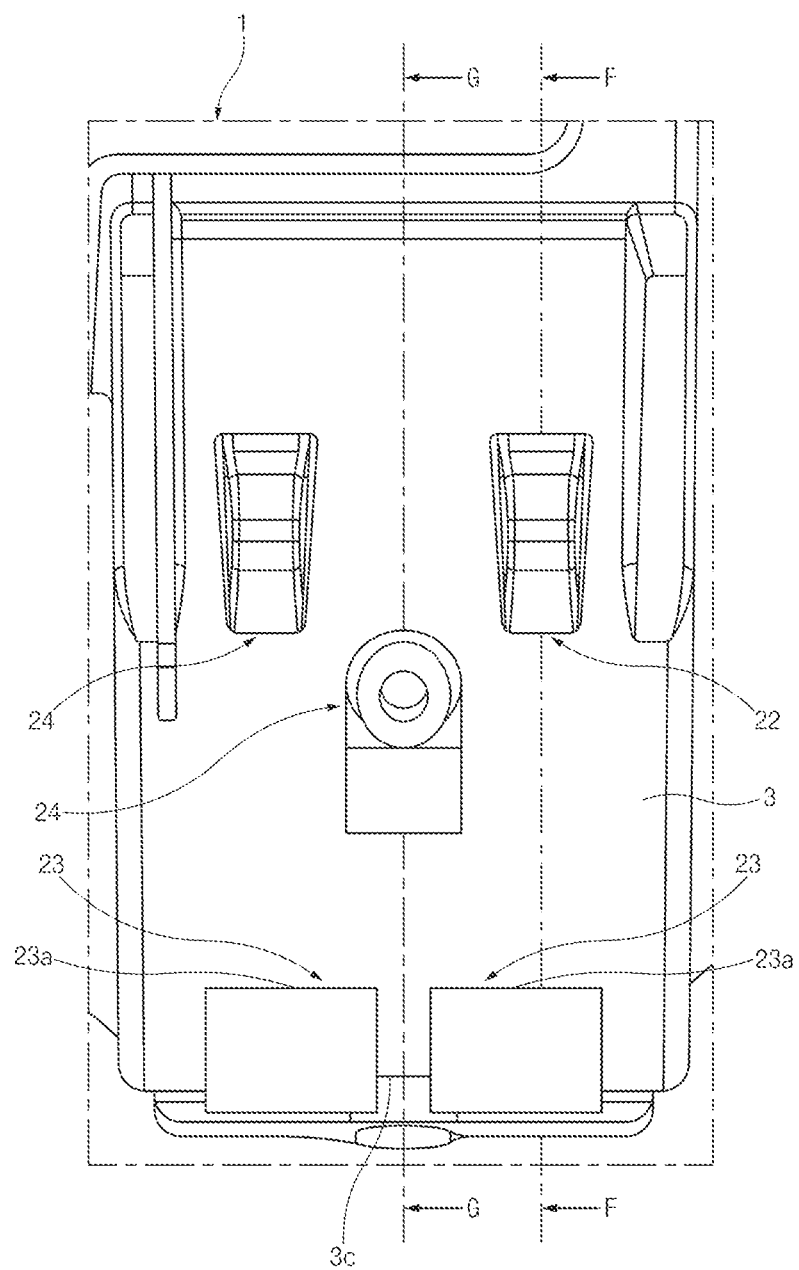
FIG. 9 illustrates a back surface of a hood release lever assembly according to an exemplary embodiment of the present disclosure, which is mounted on a front interior panel of a vehicle.

Referring to FIG. 1, the hood release lever 12 may be pivotally connected to the bracket 11 through the pivot pins 13a and 13b. Referring to FIGS. 2 and 8, the hood release lever 12 may have a base surface 12a, and the base surface 12a may face a passenger compartment of the vehicle. In addition, the hood release lever 12 may have a raised surface 12b which is raised from the base surface 12a. A mark 12c indicating the hood release lever may be provided on the raised surface 12b.

Referring to FIGS. 1 and 5, the bracket 11 may include first and second bracket-side pivot lugs 31a and 31b provided on both top sides of the bracket body 21. The first bracket-side pivot lug 31a and the second bracket-side pivot lug 31b may be spaced apart from each other by a gap corresponding to a width of the bracket body 21. For example, in FIG. 1, the first bracket-side pivot lug 31a may be located on a top right side of the bracket 11, and the second bracket-side pivot lug 31b may be located on a top left side of the bracket 11.

Referring to FIGS. 1 and 5, the hood release lever 12 may include first and second lever-side pivot lugs 32a and 32b provided on both top sides thereof. The first lever-side pivot lug 32a and the second lever-side pivot lug 32b may be spaced apart from each other by a gap corresponding to a width of the hood release lever 12. For example, in FIG. 1, the first lever-side pivot lug 32a may be located on a top right side of the hood release lever 12, and the second lever-side pivot lug 32b may be located on a top left side of the hood release lever 12.

The first bracket-side pivot lug 31a may be pivotally connected to the first lever-side pivot lug 32a through the first pivot pin 13a, and the second bracket-side pivot lug 31b may be pivotally connected to the second lever-side pivot lug 32b through the second pivot pin 13b.

Referring to FIGS. 3 and 5, the first pivot pin 13a may protrude from the first bracket-side pivot lug 31a toward the first lever-side pivot lug 32a, and the first pivot pin 13a may be inserted into a through hole of the first lever-side pivot lug 32a.

Figure 4:
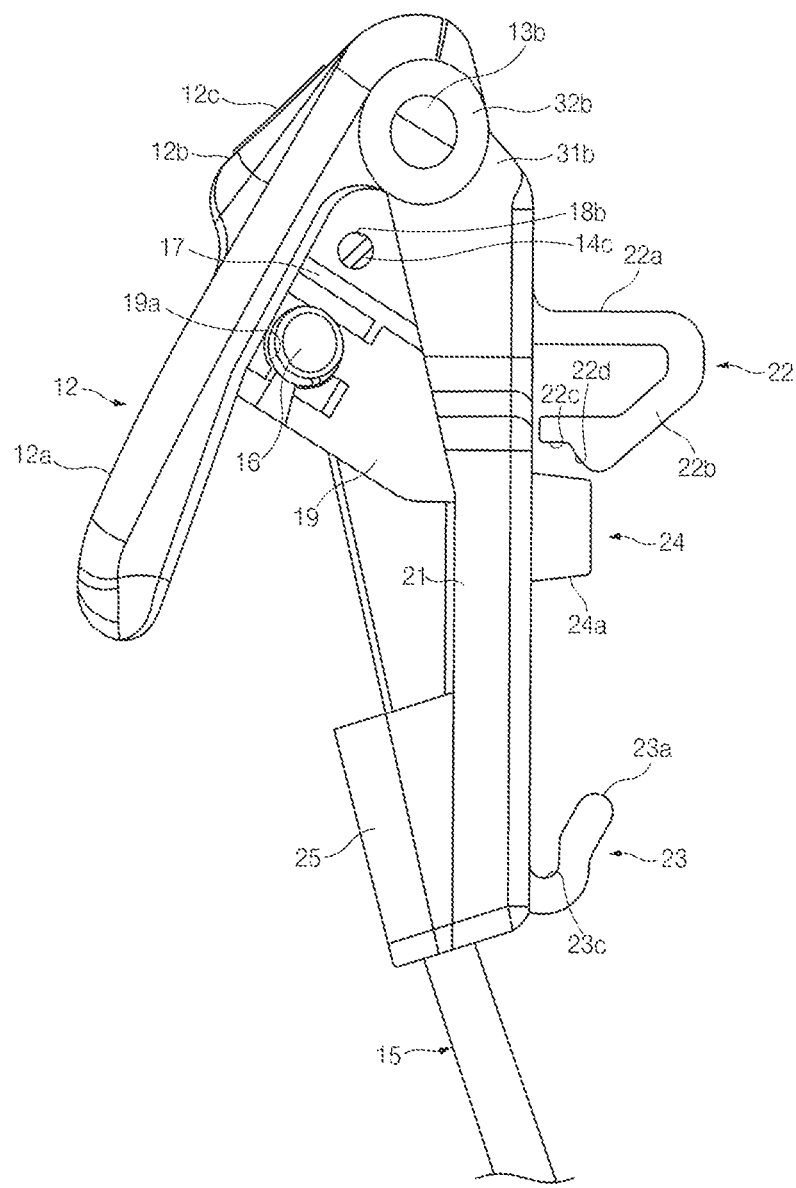
FIG. 4 illustrates a view which is viewed from a direction indicated by arrow C of FIG. 2.

Referring to FIGS. 4 and 5, the second pivot pin 13b may protrude from the second bracket-side pivot lug 31b toward the second lever-side pivot lug 32b, and the second pivot pin 13b may be inserted into a through hole of the second lever-side pivot lug 32b.

The hood release lever assembly 10 may be connected to the hood latch assembly (not shown) through the release cable 15. One end of the release cable 15 may be directly connected to the hood release lever 12, and the other end of the release cable 15 may be directly connected to the hood latch assembly.

Referring to FIGS. 3 to 6, the release cable 15 may have a pin 16 provided on one end thereof, and a longitudinal axis of the pin 16 may be perpendicular to a longitudinal axis of the release cable 15.

Figure 6:
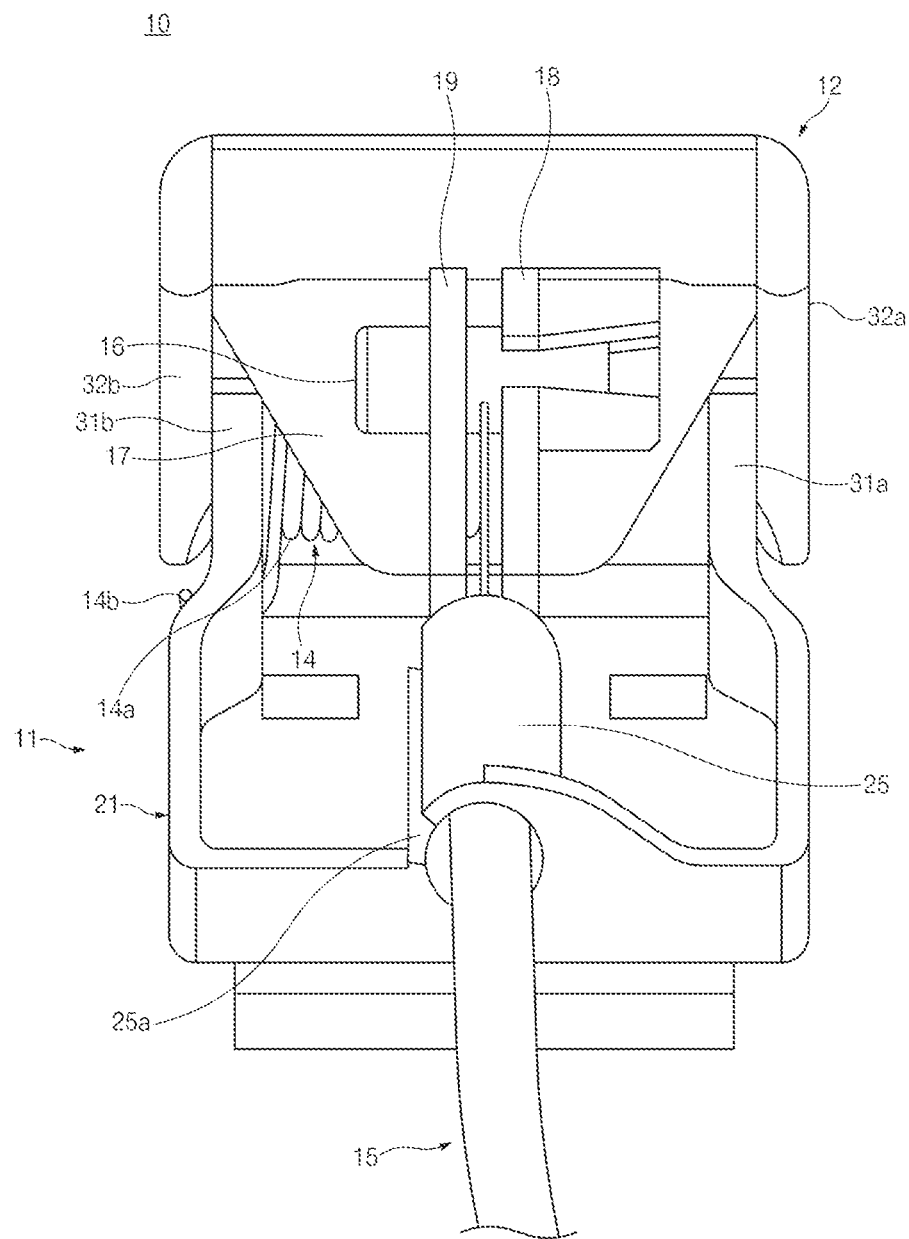
FIG. 6 illustrates a view which is viewed from a direction indicated by arrow E of FIG. 3.

Referring to FIG. 6, the hood release lever 12 may include a flat rib 17 extending in a width direction thereof, and first and second reinforcing ribs 18 and 19 perpendicular to the flat rib 17. The first reinforcing rib 18 may face the first bracket-side pivot lug 31a and the first lever-side pivot lug 32a. Referring to FIG. 3, the first reinforcing rib 18 may include a first hole 18a into which the pin 16 of the release cable 15 is inserted. The second reinforcing rib 19 may face the second bracket-side pivot lug 31b and the second lever-side pivot lug 32b. Referring to FIG. 4, the second reinforcing rib 19 may include a second hole 19a into which the pin 16 of the release cable 15 is inserted. The first hole 18a of the first reinforcing rib 18 may be aligned with the second hole 19a of the second reinforcing rib 19 in the width direction of the hood release lever 12. The pin 16 of the release cable 15 may be inserted into the first hole 18a of the first reinforcing rib 18 and the second hole 19a of the second reinforcing rib 19. Accordingly, the pin 16 of the release cable 15 may be connected to the hood release lever 12, and the release cable 15 may move along the longitudinal axis thereof as the hood release lever 12 pivots with respect to the bracket 11.

Referring to FIGS. 2 to 4, the bracket body 21 may have a guide block 25 provided on a lower portion thereof and guiding a movement of the release cable 15. The guide block 25 may have a guide cavity defined therein, and a portion of the release cable 15 may be guided within the guide cavity of the guide block 25. The guide block 25 may have an opening 25a, and a portion of the release cable 15 may be inserted into the guide cavity of the guide block 25 through the opening 25a.

The hood release lever 12 may pivot around the pivot pins 13a and 13b. When a user opens a hood of the vehicle, the release cable 15 may be pulled as the user pulls the hood release lever 12. Accordingly, a latch of the hood latch assembly may release the hood from a vehicle body.

Referring to FIG. 5, the hood release lever 12 may include a retainer projection 13c protruding from the first lever-side pivot lug 32a of the hood release lever 12 toward the center of the hood release lever 12. That is, the retainer projection 13c may protrude from the first lever-side pivot lug 32a in a direction opposite to the first pivot pin 13a.

The hood release lever assembly 10 may include a torsion spring 14 provided between the bracket 11 and the hood release lever 12. The torsion spring 14 may provide a biasing force causing the hood release lever 12 to be biased toward a locked position. The torsion spring 14 may include a coil portion 14a disposed around the retainer projection 13c, a first spring leg 14b extending from one end of the coil portion 14a, and a second spring leg 14c extending from the other end of the coil portion 14a. Referring to FIG. 3, the first spring leg 14b may be supported to the bracket 11, and the second spring leg 14c may be supported to the hood release lever 12. A first through hole 21a may be provided in a sidewall of the bracket body 21 of the bracket 11, and the first spring leg 14b may be supported to the first through hole 21a. A second through hole 18b may be provided in the first reinforcing rib 18, and the second spring leg 14c may be supported to the second through hole 18b.

Figure 14:
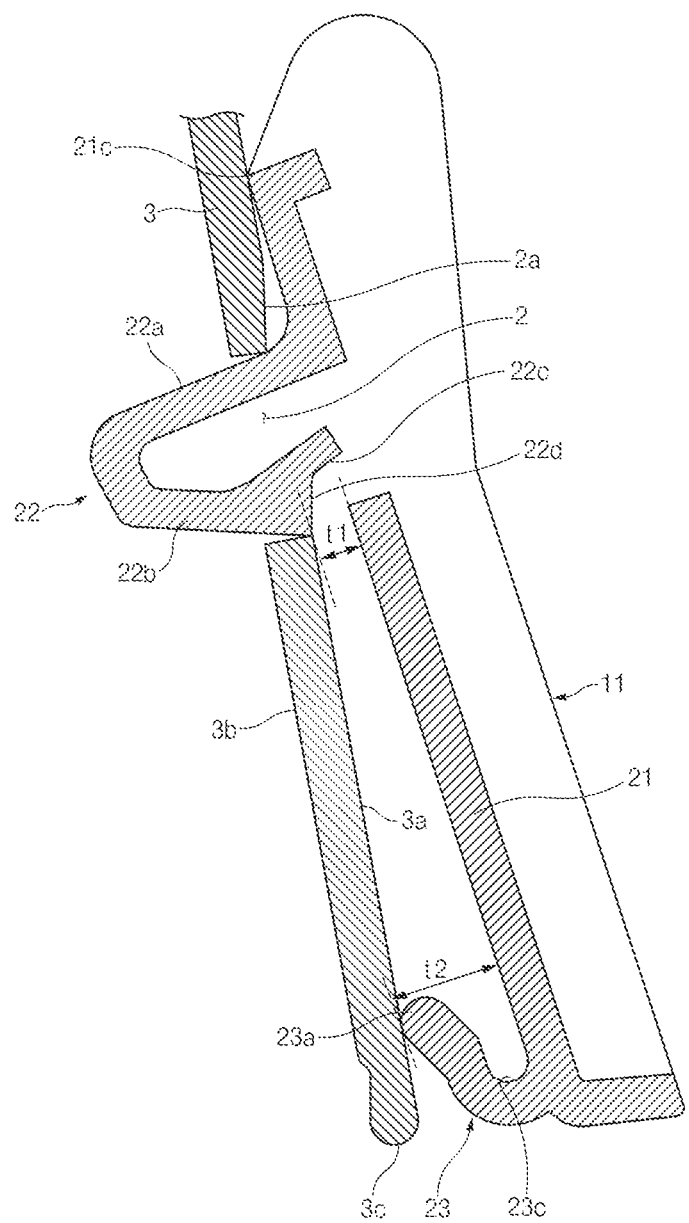
FIG. 14 illustrates the prevention of incorrect assembly of a retention clip of a bracket of a hood release lever assembly according to an exemplary embodiment of the present disclosure with respect to a mounting hole of a mounting wall.
Figure 15:
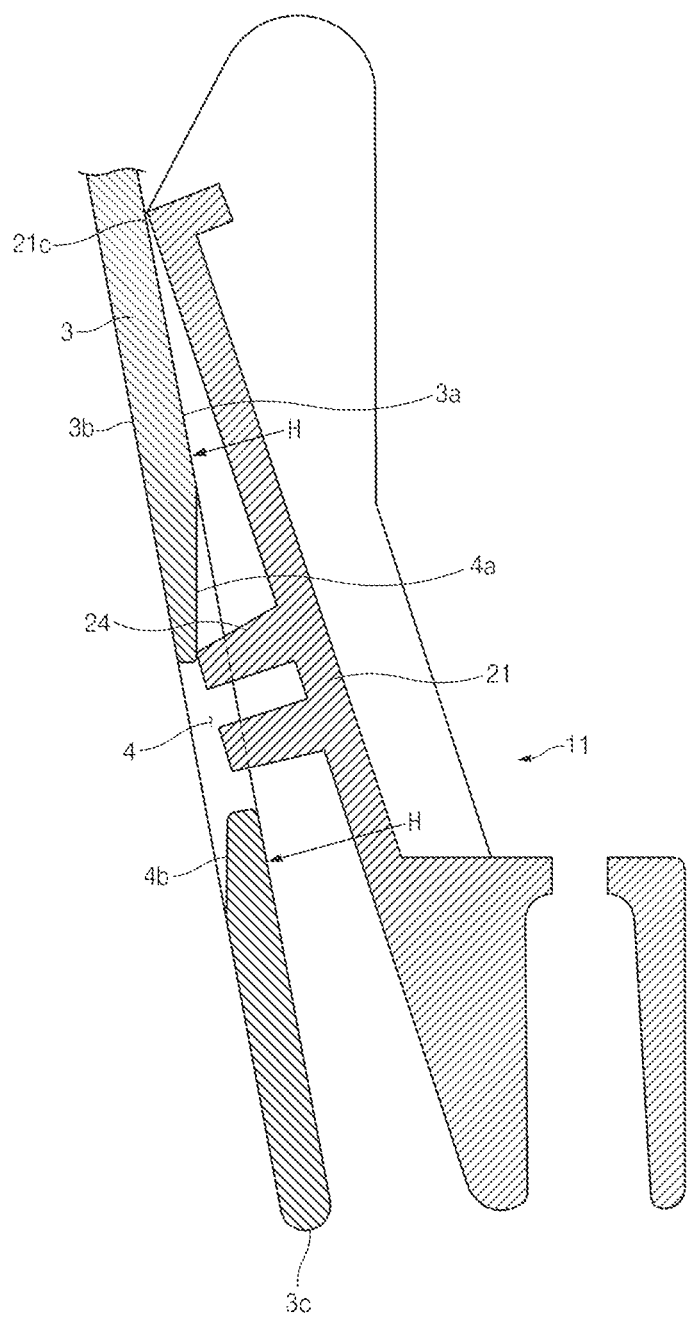
FIG. 15 illustrates the prevention of incorrect assembly of a guide projection of a bracket of a hood release lever assembly according to an exemplary embodiment of the present disclosure with respect to a guide hole of a mounting wall.
Figure 16:
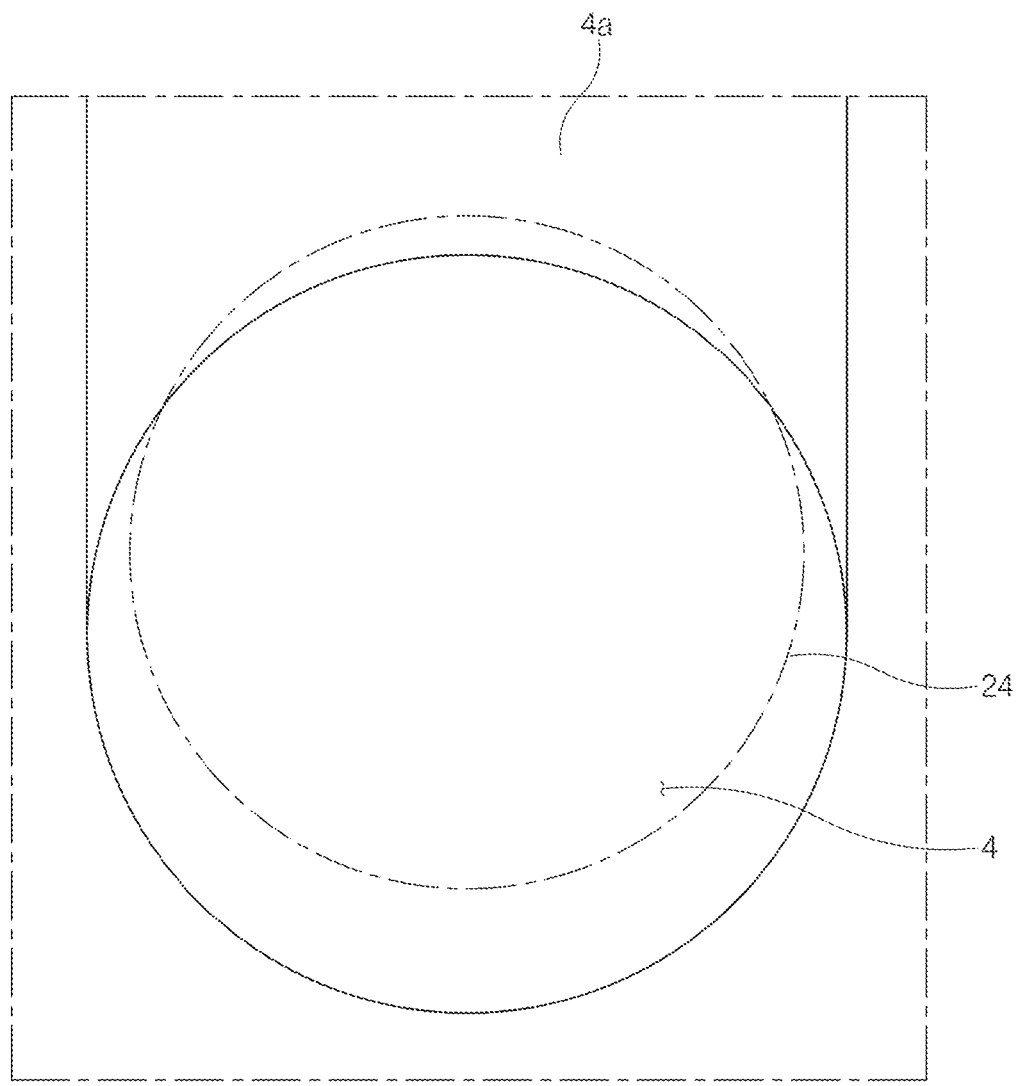
FIG. 16 illustrates a cross-sectional view, taken along line H-H of FIG. 15.
Figure 17:
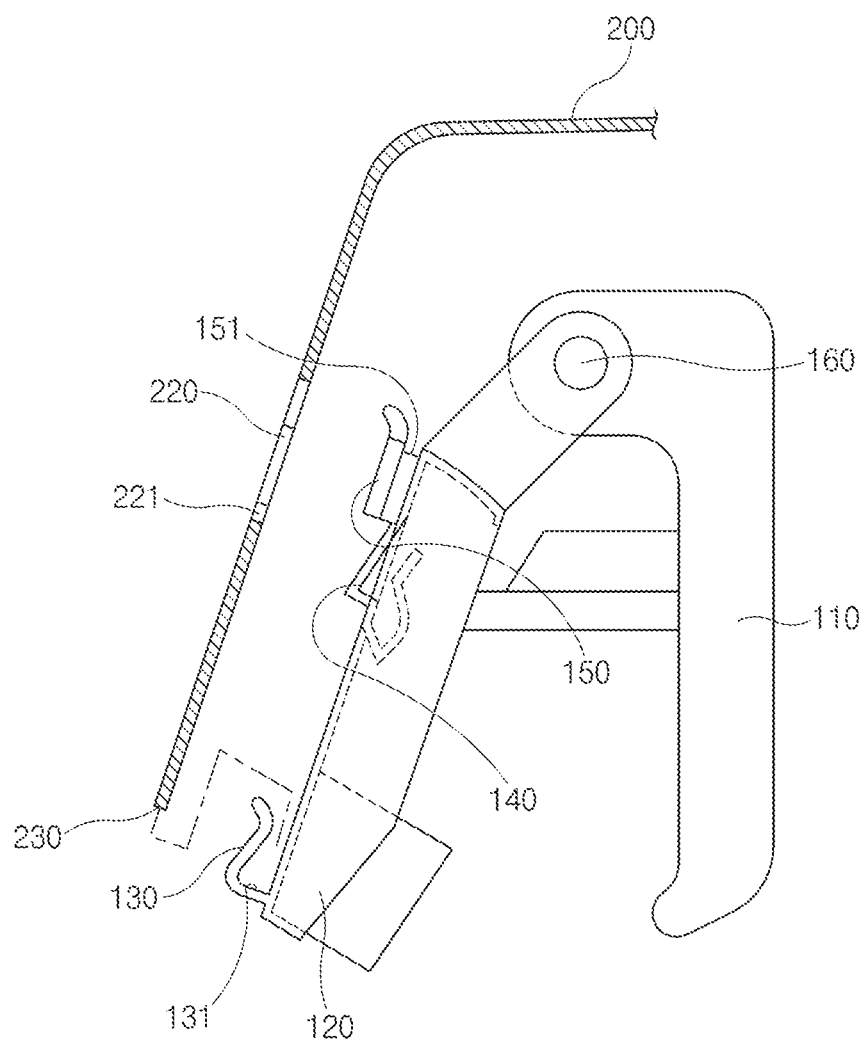
FIG. 17 illustrates a state before a hood release lever assembly according to the related art is mounted on an instrument panel of a vehicle.
Figure 18:
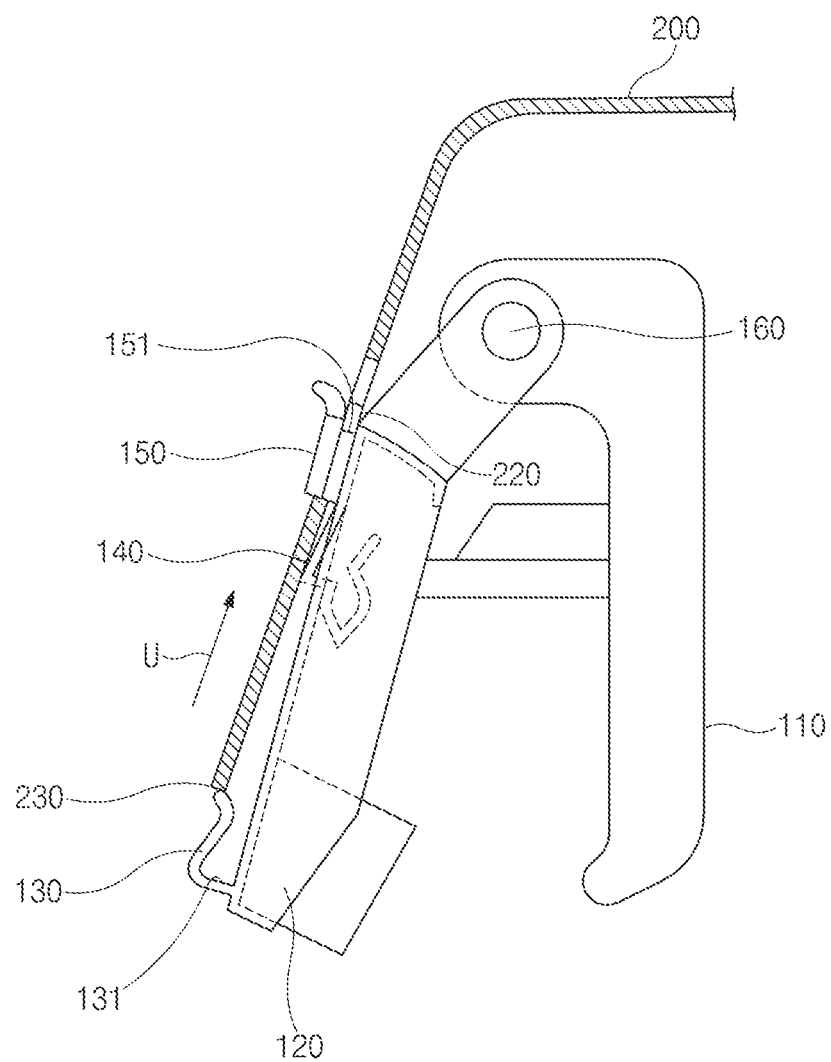
FIG. 18 illustrates a process of mounting a hood release lever assembly according to the related art on an instrument panel of a vehicle.
Figure 19:
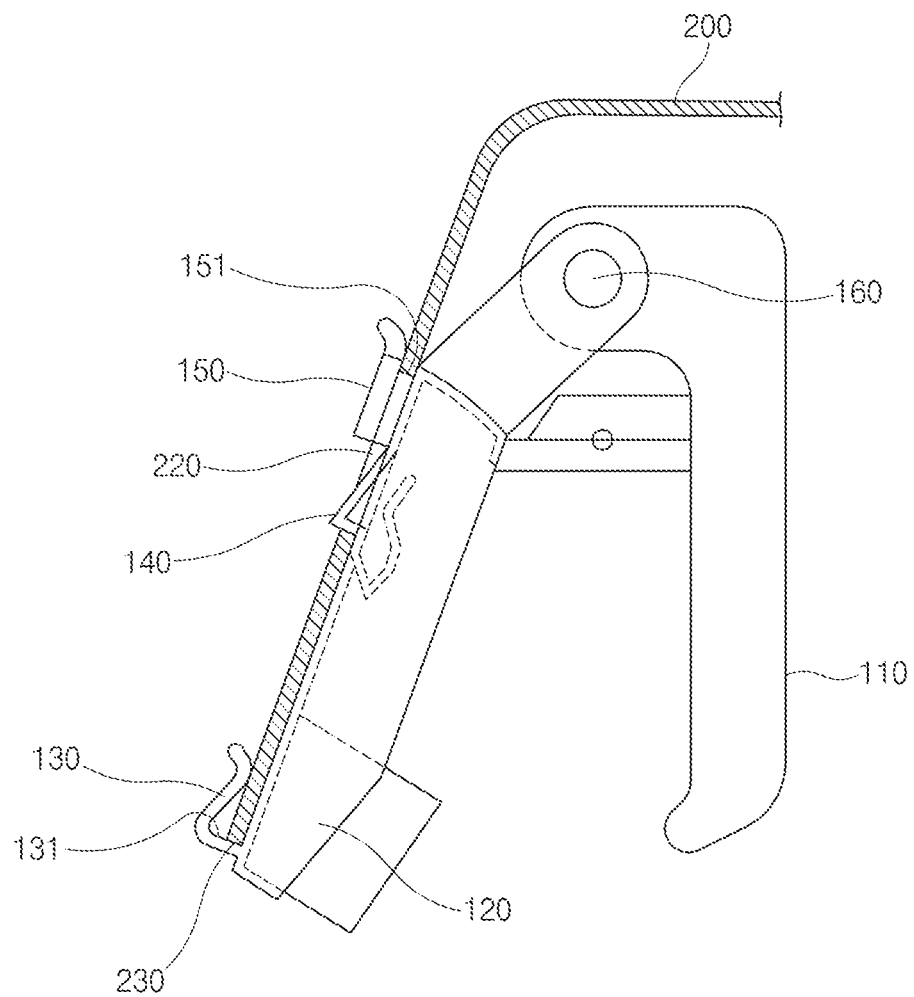
FIG. 19 illustrates a state in which a hood release lever assembly according to the related art is completely mounted on an instrument panel of a vehicle.
Figure 20:
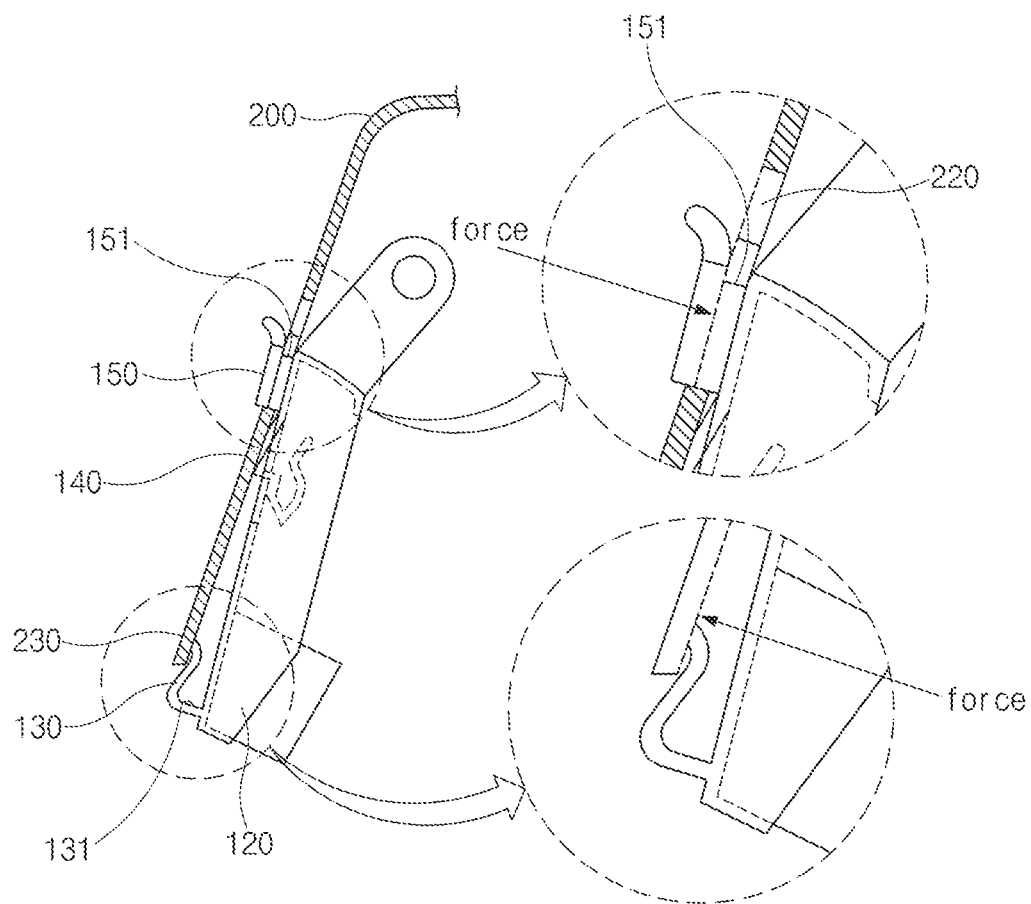
FIG. 20 illustrates a state in which a hood release lever assembly according to the related art is incorrectly mounted on an instrument panel of a vehicle.

Referring to FIG. 10, as the retention shoulder 22c of the retention clip 22 is aligned with the second edge of the slot 28, the retention shoulder 22c may face the guide projection 24 and the hooked rib 23, and the retention stopper 22d of the retention clip 22 may be spaced apart from the bracket body 21 by a first gap t1. Since the hooked rib 23 has a predetermined length, the free end 23a of the hooked rib 23 may be spaced apart from the bracket body 21 by a second gap t2. In particular, the second gap t2 may be greater than the first gap t1. As illustrated in FIG. 14, when a top end 21c of the bracket body 21 of the bracket 11 comes into contact with the mounting wall 3 of the front interior panel 1 before the hooked rib 23 is temporarily engaged with the bottom end of the mounting wall 3, the retention shoulder 22c of the retention clip 22 may be prevented from being inserted into the mounting hole 2 of the mounting wall 3 since the retention stopper 22d of the retention clip 22 is spaced apart from the bracket body 21 by the first gap t1, the free end 23a of the hooked rib 23 is spaced apart from the bracket body 21 by the second gap t2, and the second gap t2 is greater than the first gap t1. Thus, the bracket 11 may be prevented from being incorrectly mounted on the mounting wall 3. As illustrated in FIG. 15, when the top end 21c of the bracket body 21 of the bracket 11 comes into contact with the mounting wall 3 of the front interior panel 1 before the hooked rib 23 is temporarily engaged with the bottom end of the mounting wall 3, a top edge portion of the guide projection 24 may partially overlap the first inclined surface 4a as illustrated in FIG. 16, and accordingly the guide projection 24 may be prevented from being inserted into the guide hole 4 of the mounting wall 3. Thus, the bracket 11 may be prevented from being incorrectly mounted on the mounting wall 3.

As set forth above, according to exemplary embodiments of the present disclosure, the free end 23a of the hooked rib 23 provided on the bottom end of the bracket 11 may face the retention shoulder 22c of the retention clip 22 provided on the upper portion of the bracket 11, and the hooked rib 23 may be allowed to rotate around the bottom end of the mounting wall 3 of the front interior panel 1. As an external force for the assembly (mounting) of the bracket 1 of the hood release lever assembly 10 with respect to the mounting wall 3 of the front interior panel 1 is only applied in the rotation direction of the bracket 11, the assembly (mounting)

of the hood release lever assembly 10 with respect to the front interior panel 1 may be performed in one direction. Thus, the hood release lever assembly 10 and the front interior panel 1 of the vehicle may be assembled quickly and easily without any separate tool. In particular, since the bracket 11 is able to rotate on the bottom end of the mounting wall 3 of the front interior panel 1 in a state in which the release cable 15 has already been connected to the hood release lever 12, the assembling of the hood release lever assembly 10 may be improved, and the assembly cost thereof may be significantly reduced.

In addition, the base surface 12*a* of the hood release lever 12 may serve as a gripping surface, and accordingly the gripping surface having a relatively large area may be provided, thereby improving the worker's work efficiency. As the bracket 11 rotates on the hooked rib 23 and the bottom end of the mounting wall 3 of the front interior panel 1, the retention clip 22 of the bracket 11 may be correctly snap-fitted into the mounting hole 2 of the front interior panel 1, and thus it may be easy to check by the worker's sense whether the hood release lever assembly is correctly mounted, without any need to see with the naked eye whether the assembly is normally performed.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A hood release lever assembly comprising:
a bracket; and
a hood release lever pivotally connected to the bracket,
wherein the bracket comprises a bracket body, a retention clip protruding from the bracket body, and a hooked rib located at a bottom end of the bracket body,
wherein a free end of the hooked rib faces the retention clip,
wherein the bracket body comprises a guide projection located between the retention clip and the hooked rib, and
wherein the guide projection has a conical shape having a diameter that decreases in a direction away from the bracket body.

2. The hood release lever assembly according to claim 1, wherein the hooked rib has a round surface, and
wherein the round surface has a predetermined radius of curvature.

3. The hood release lever assembly according to claim 1, wherein the retention clip comprises a first leg protruding from the bracket body, a second leg inclined with respect to the first leg at a predetermined angle and a retention shoulder located at a free end of the second leg.

4. The hood release lever assembly according to claim 3, wherein the retention clip further includes a retention stopper inclined with respect to the retention shoulder.

5. The hood release lever assembly according to claim 3, wherein the retention shoulder is spaced apart from the bracket body by a first gap,
wherein the free end of the hooked rib is spaced apart from the bracket body by a second gap, and
wherein the second gap is greater than the first gap.

6. The hood release lever assembly according to claim 3, wherein the bracket body comprises a slot,
wherein the first leg is connected to a first edge of the slot in a cantilevered manner, and
wherein the retention shoulder is spaced apart from a second edge of the slot.

7. The hood release lever assembly according to claim 6, wherein the second edge of the slot is positioned closer to the hooked rib than the first edge of the slot.

8. A mounting assembly comprising:
a hood release lever assembly including a bracket and a hood release lever pivotally connected to the bracket; and
a front interior panel having a mounting wall on which the bracket is mounted,
wherein the bracket includes a bracket body, a retention clip protruding from the bracket body toward the mounting wall of the front interior panel, and a hooked rib located at a bottom end of the bracket body,
wherein the mounting wall has a mounting hole into which the retention clip is fittable,
wherein the hooked rib has a cavity in which a bottom end of the mounting wall is receivable,
wherein a free end of the hooked rib faces the retention clip,
wherein the bracket body includes a guide projection provided between the retention clip and the hooked rib,
wherein the guide projection has a conical shape having a diameter that decreases in a direction away from the bracket body, and
wherein the mounting wall has a guide hole into which the guide projection is insertable.

9. The assembly according to claim 8,
wherein the hooked rib has a first round surface located in the cavity,
wherein the mounting wall has a second round surface located a bottom end, the second round surface contacting the first round surface, and
wherein the second round surface has a predetermined radius of curvature which is the same as that of the first round surface.

10. The assembly according to claim 8,
wherein the mounting wall includes a first surface facing the hood release lever assembly, and a second surface opposing the first surface, and
wherein the mounting wall includes a guide surface inclined from the mounting hole.

11. The assembly according to claim 8,
wherein the hooked rib has a round surface, and
wherein the round surface has a predetermined radius of curvature.

12. The assembly according to claim 8, wherein the retention clip comprises a first leg protruding from the bracket body, a second leg inclined with respect to the first leg at a predetermined angle and a retention shoulder located at a free end of the second leg.

13. The assembly according to claim 12, wherein the retention clip further includes a retention stopper inclined with respect to the retention shoulder.

14. The assembly according to claim 13,
wherein the retention shoulder is spaced apart from the bracket body by a first gap,
wherein the free end of the hooked rib is spaced apart from the bracket body by a second gap, and
wherein the second gap is greater than the first gap.

15. The assembly according to claim 13,
wherein the bracket body comprises a slot,
wherein the first leg is connected to a first edge of the slot in a cantilevered manner, and
wherein the retention shoulder is spaced apart from a second edge of the slot.

16. The assembly according to claim 15, wherein the second edge of the slot is positioned closer to the hooked rib than the first edge of the slot.

* * * * *